(12) United States Patent
Zhong et al.

(10) Patent No.: US 11,822,222 B2
(45) Date of Patent: Nov. 21, 2023

(54) NON-COAXIAL PROJECTION LIGHT SOURCE SYSTEM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Lei Yin, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 198 days.

(21) Appl. No.: 17/599,579

(22) PCT Filed: Mar. 10, 2020

(86) PCT No.: PCT/CN2020/078544
§ 371 (c)(1),
(2) Date: Sep. 29, 2021

(87) PCT Pub. No.: WO2020/220837
PCT Pub. Date: Nov. 5, 2020

(65) Prior Publication Data
US 2022/0197122 A1    Jun. 23, 2022

(30) Foreign Application Priority Data

Apr. 30, 2019  (CN) .......................... 201910365128.0

(51) Int. Cl.
*G02B 26/00* (2006.01)
*G03B 21/20* (2006.01)

(52) U.S. Cl.
CPC ......... *G03B 21/204* (2013.01); *G02B 26/008* (2013.01); *G03B 21/208* (2013.01)

(58) Field of Classification Search
CPC .... G03B 21/204; G03B 21/208; G03B 33/08; G03B 21/206; G02B 26/008
See application file for complete search history.

(56) References Cited

U.S. PATENT DOCUMENTS

2010/0309439 A1    12/2010    Bi et al.

FOREIGN PATENT DOCUMENTS

| CN | 105388691 | A |   | 3/2016 |           |
|----|-----------|---|---|--------|-----------|
| CN | 207457687 | U | * | 6/2018 | ............. G03B 21/20 |
| CN | 108646510 | A |   | 10/2018 |          |

(Continued)

OTHER PUBLICATIONS

English Machine Translation of CN 207 457 687, Guo et al (Year: 2023).*

(Continued)

*Primary Examiner* — Donald L Raleigh
(74) *Attorney, Agent, or Firm* — Yu Gang

(57) ABSTRACT

Disclosed is a non-coaxial projection light source system including a light source, a fluorescent wheel, and a converging shaping lens group located between the light source and the fluorescent wheel. Excitation light emitted by the light source is emitted to the converging shaping lens group in an optical axis direction inclined to the converging shaping lens group and then is emitted to the fluorescent wheel. Radiating fluorescent light generated by excitation on the fluorescent wheel is emitted to the converging shaping lens group and then is converged to a light path direction different from the excitation light to be output.

18 Claims, 4 Drawing Sheets

(56) References Cited

FOREIGN PATENT DOCUMENTS

| | | | |
|---|---|---|---|
| CN | 108803215 | A | 11/2018 |
| CN | 109960099 | A | 7/2019 |
| CN | 209674172 | U | 11/2019 |
| JP | 2006139198 | A | 6/2006 |
| JP | 2017182071 | A | 10/2017 |
| WO | 2017195857 | A1 | 11/2017 |
| WO | 2018074125 | A1 | 4/2018 |

OTHER PUBLICATIONS

The first office action of family patent JP application dated Jul. 8, 2022.

* cited by examiner

NON-COAXIAL PROJECTION LIGHT SOURCE SYSTEM

TECHNICAL FIELD

The embodiments of the disclosure relate to the technical field of illumination light sources, in particular to a non-coaxial projection light source system.

BACKGROUND

Light sources of projection systems are mainly divided into three types: a bulb light source, an LED light source, and a laser light source. The laser light source is the most concerned projection light source in recent years. The laser light source has the characteristics of large wavelength selectivity, high spectral brightness, etc., more than 90% color gamut coverage of natural colors seen by human eyes may be synthesized, and perfect color restoration is realized. Meanwhile, the laser light source has ultra-high brightness and long service life, and the later maintenance cost is greatly reduced.

In the currently adopted projection light source system, excitation light is utilized to irradiate a fluorescent wheel to generate radiating fluorescent light, light paths of the radiating fluorescent light and the excitation light are generally coincident, components such as a dichroic mirror are needed to separate the light paths of the radiating fluorescent light and the excitation light so as to output the radiating fluorescent light into white light, and therefore the projection light source system is complex in light path, multiple in components, large in occupied volume, and high in manufacturing cost.

SUMMARY

A non-coaxial projection light source system includes a light source, a fluorescent wheel, and a converging shaping lens group located between the light source and the fluorescent wheel. Excitation light emitted by the light source is emitted to the converging shaping lens group in an optical axis direction inclined to the converging shaping lens group and then is emitted to the fluorescent wheel. Radiating fluorescent light generated by excitation on the fluorescent wheel is emitted to the converging shaping lens group and then is converged to a light path direction different from the excitation light to be output. The non-coaxial projection light source system directly utilizes the converging shaping lens group to separate light paths of the excitation light and the radiating fluorescent light, a dichroic mirror is not needed, system components are effectively reduced, system occupied volume is reduced, and system cost is reduced. The radiating fluorescent light generated by excitation on the fluorescent wheel is a Lambert reflector light source and is distributed in a 180-degree direction. The radiating fluorescent light is emitted to the converging shaping lens group through which the incident excitation light passes. An emergent direction of the radiating fluorescent light after being converged by the converging shaping lens group is different from a direction in which the excitation light inclined to the optical axis of the converging shaping lens group is located, the light paths are separated, and the radiating fluorescent light emitted from the converging shaping lens group can be directly combined for output without adding components for realizing light splitting, so that the system structure is more compact, the light path components of the system are fewer, loss in a light conveying process is reduced, and light source output brightness is improved.

Alternative, the converging shaping lens group is provided with a through hole through which excitation light directly passes, the directivity of the excitation light is good, the excitation light is collimated parallel light, the excitation light is prevented from being transmitted out through the converging shaping lens group, the loss of the excitation light is reduced, the power of the excitation light irradiating the fluorescent wheel is improved, and the power of the radiating fluorescent light generated by excitation is improved.

Alternative, the radiating fluorescent light generated by excitation on the fluorescent wheel is converged to the optical axis direction of the converging shaping lens group by the converging shaping lens group, the converging shaping effect of the radiating fluorescent light emitted along the optical axis direction is good, the directivity of the emitted radiating fluorescent light is easier to control, and the quality of final light source output is improved.

Alternative, the excitation light emitted by the light source irradiates the fluorescent wheel in a direction inclined to a rotational axis of the fluorescent wheel after being transmitted through the converging shaping lens group, thereby ensuring that the light path of the converged radiating fluorescent light can be fully separated from the light path of the excitation light.

Alternative, the Abbe number of at least one lens in the converging shaping lens group is less than or equal to 30. The converging shaping lens group has a better dispersion effect. The light paths of light of different wavelengths can be separated at a larger angle when being transmitted through the converging shaping lens group, so that the light paths of laser light and fluorescent light can be separated better.

Alternative, the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions. Different radiating fluorescent light generated by excitation and excitation light transmitted by the excitation light transmission region or excitation light emitted by the excitation light reflection region are subjected to mixed light output, the luminous flux of the output light is improved, the projection display color is better, the color gamut is large, and the image reproduction color is bright.

Alternative, the excitation light transmission region is a white glass or diffuser disposed on the phosphor wheel, and speckles are eliminated.

Alternative, the excitation light reflection region diffusely reflects the excitation light, the excitation light is also a Lambert reflector light source similar to the radiating fluorescent light after being reflected, the reflected excitation light is output after being converged by the converging shaping lens group, speckles can be effectively eliminated, and the projection effect is improved.

Alternative, the excitation light reflection region is a reflector disposed on the back side of the phosphor wheel parallel to the phosphor wheel.

Alternative, the non-coaxial projection light source system also includes: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output. The light combining assembly is compact in structure and small in occupied volume, the color-filter color wheel filters light and outputs the light so that the color is brighter, the light rod homogenizes an output beam, and the homogeneity of the output light is improved.

Compared with the related art, the disclosure has the following advantages.

The non-coaxial projection light source system is simple and compact in structure, a dichroic mirror for splitting light is omitted, system components are effectively reduced, system cost is reduced, system occupied volume is reduced, the system structure is more compact, loss in a light conveying process is reduced, and light source output brightness is improved.

DETAILED DESCRIPTION OF THE EMBODIMENTS

The technical solutions in the embodiments of the disclosure will be clearly and completely described below with reference to the drawings in the embodiments of the disclosure. It is apparent that the described embodiments are only a part of the embodiments of the disclosure, not all of the embodiments. Based on the embodiments of the disclosure, all other embodiments obtained on the premise of no creative work of those of ordinary skill in the art should fall within the scope of protection of the disclosure.

According to a non-coaxial projection light source system disclosed by the embodiments of the disclosure, a dichroic mirror is omitted, the light path structure is simpler and more compact, the system volume is effectively reduced, and the manufacturing cost is reduced.

The non-coaxial projection light source system mainly includes a light source 1, a fluorescent wheel 2, and a converging shaping lens group 3 located between the light source and the fluorescent wheel. Excitation light emitted by the light source 1 is emitted to the converging shaping lens group 3 in an optical axis direction inclined to the converging shaping lens group 3 and then is emitted to the fluorescent wheel 2. Radiating fluorescent light generated by excitation on the fluorescent wheel 2 is emitted to the converging shaping lens group 3 and then is converged to a light path direction different from the excitation light to be output. The radiating fluorescent light generated by excitation on the fluorescent wheel is a Lambert reflector light source and is distributed in a 180-degree direction. An emergent direction of the radiating fluorescent light emitted in a large range is approximately along the optical axis of the converging shaping lens group after being converged by the converging shaping lens group, so that a light path of the radiating fluorescent light emitted from the converging shaping lens group is separated from a light path of the excitation light. Therefore, the light paths of the radiating fluorescent light and the excitation light can be separated without a dichroic mirror, the number of components of the system is reduced, and the volume is reduced.

The converging shaping lens group 3 is preferably a lens with a smaller dispersion coefficient Vd, so that the converging shaping lens group 3 can achieve a better dispersion effect, light with different colors deflects at different angles when being transmitted, an emergent light path of the radiating fluorescent light can be better separated from the light path of the excitation light, the emergent light path of the radiating fluorescent light and the light path of the excitation light are separated at a larger angle, and light of each color can be homogenized through a diffusion sheet, a light rod, etc. at a rear end, and then combined into the same coaxial light path.

Embodiment 1

Figure 1:
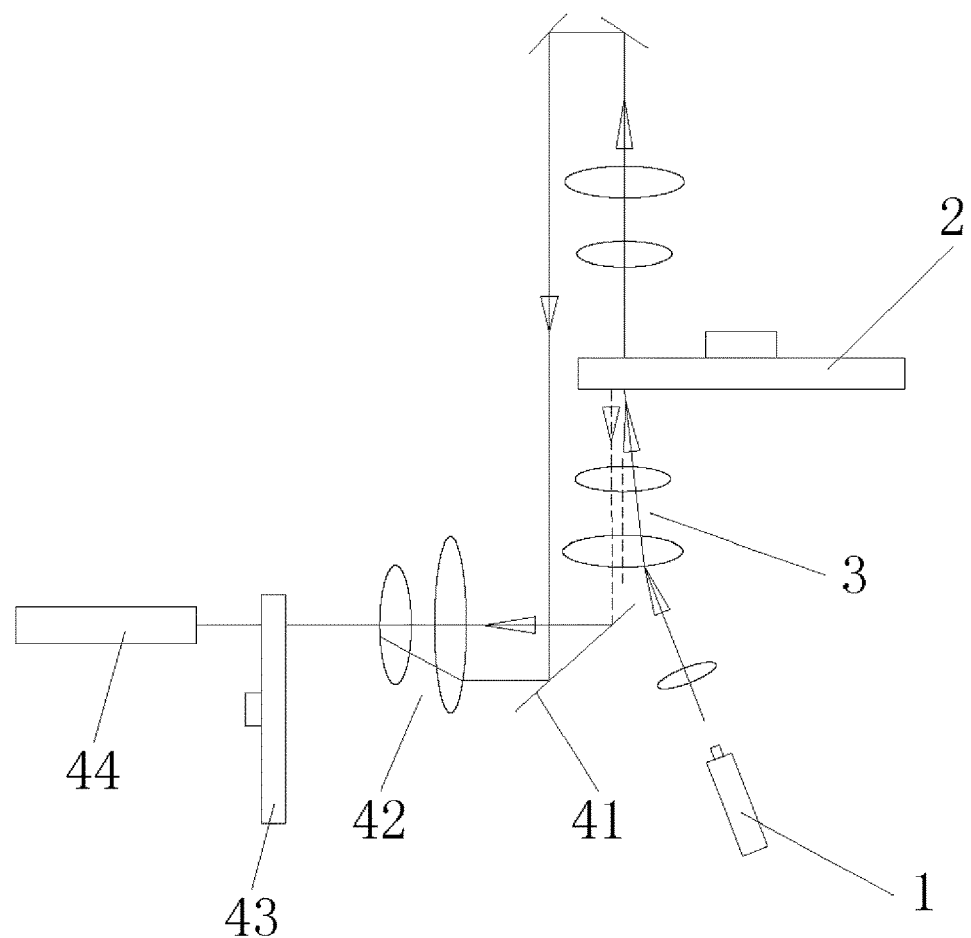
FIG. 1 is a schematic structure diagram of a non-coaxial projection light source system according to Embodiment 1.
Figure 2:
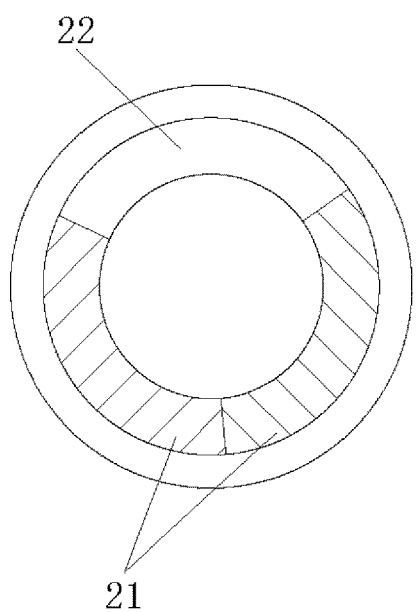
FIG. 2 is a schematic structure diagram of a fluorescent wheel of a non-coaxial projection light source system according to Embodiment 1.

As shown in FIGS. 1 and 2, a non-coaxial projection light source system mainly includes a light source 1, a fluorescent wheel 2, a converging shaping lens group 3, and a light combining assembly.

The light source 1 adopts a blue laser source, is collimated parallel light, has good directivity, is easy to converge and shape in a light path, and is relatively easy to control. The converging shaping lens group 3 is preferably an aspheric lens, and more effectively utilizes the separation of the light paths of the radiating fluorescent light and the excitation light.

The light source 1 emits excitation light of blue laser, the excitation light is transmitted to the fluorescent wheel 2 after being converged and shaped by the converging shaping lens group 3, the fluorescent wheel 2 is provided with a plurality of phosphor regions 21 along a circumferential direction for exciting to generate radiating fluorescent light of different colors, and the fluorescent wheel 2 is further provided with an excitation light transmission region 22 distributed in the same circumference as the phosphor regions 21. The radiating fluorescent light generated by the phosphor region 21 may be red, green or yellow, the brightness can be increased, the excitation light transmission region 22 may be a white glass or diffuser disposed on the phosphor wheel 2, and speckles are eliminated.

The fluorescent wheel 2 continuously rotates, the excitation light irradiating the fluorescent wheel 2 sequentially and circularly irradiates the phosphor region 21 and the excitation light transmission region 22 which generate radiating fluorescent light of different colors, when the excitation light irradiates the phosphor region 21, the radiating fluorescent light is generated through excitation, the radiating fluorescent light is dispersed in all directions, and the part of the radiating fluorescent light emitted to the converging shaping lens group 3 is converged and shaped by the converging shaping lens group 3 and then emitted in one direction. Since the excitation light emitted from the light source is emitted to the converging shaping lens group 3 in the optical axis direction inclined to the converging shaping lens group 3 and then emitted onto the fluorescent wheel 2, so that the emergent light path direction of converging and shaping of the radiating fluorescent light and the light path direction of the incident excitation light are not in the same direction. The light paths are staggered, and a dichroic mirror is omitted, so that the system structure is more compact. Preferably, the radiating fluorescent light generated by excitation on the fluorescent wheel 2 is converged to the optical axis direction of the converging shaping lens group 3 by the converging shaping lens group 3. When the excitation light irradiates the excitation light transmission region 22, the excitation light is emitted from the excitation light transmission region 22 to the rear side of the fluorescent wheel 2 through the fluorescent wheel 2. A light path deflecting assembly is disposed on the rear side of the fluorescent wheel 2. The light path deflecting assembly includes a reflector, a focusing lens, etc. The light path of the excitation light passing through the fluorescent wheel 2 is deflected, so that the excitation light and the radiating fluorescent light of this part are led to a light combining assembly for light combining output.

In the present embodiment, the light combining assembly includes a light combining reflector 41, a beam shaping module 42, and a color-filter color wheel 43 and a light rod 44 which rotate synchronously with the fluorescent wheel, and the radiating fluorescent light converged from the converging shaping lens group 3 is emitted to the light combining reflector 41. The excitation light passing through the fluorescent wheel 2 from the excitation light transmission region 22 is also emitted to the light combining reflector 41 under the action of a light path deflecting assembly. Then, the radiating fluorescent light and the excitation light sequentially pass through the beam shaping module 42, the color-filter color wheel 43, and the light rod 44 for light combining output. The beam shaping module 42 focuses and shapes the radiating fluorescent light and the excitation light. Then, the color-filter color wheel 43 filters radiating fluorescent light and excitation light of various colors. Finally, the light rod homogenizes an output beam.

In the present embodiment, the Abbe number of at least one lens in the converging shaping lens group is less than or equal to 30, so that the light paths of laser light and fluorescent light can be separated better. Since the main wavelengths of three primary colors of the system are dispersed at present, the wavelength ranges of the three colors are separated by about 50 nm. For example, the main wavelength of blue light is concentrated at 450-460 nm, the main wavelength of green light is concentrated at 510-570 nm, and the main wavelength of red light is concentrated at 620-680 nm. Therefore, the three-color light can be better separated by adopting the converging shaping lens group with a good dispersion effect, i.e. the light paths of laser light and fluorescent light can be better separated.

Embodiment 2

Figure 3:
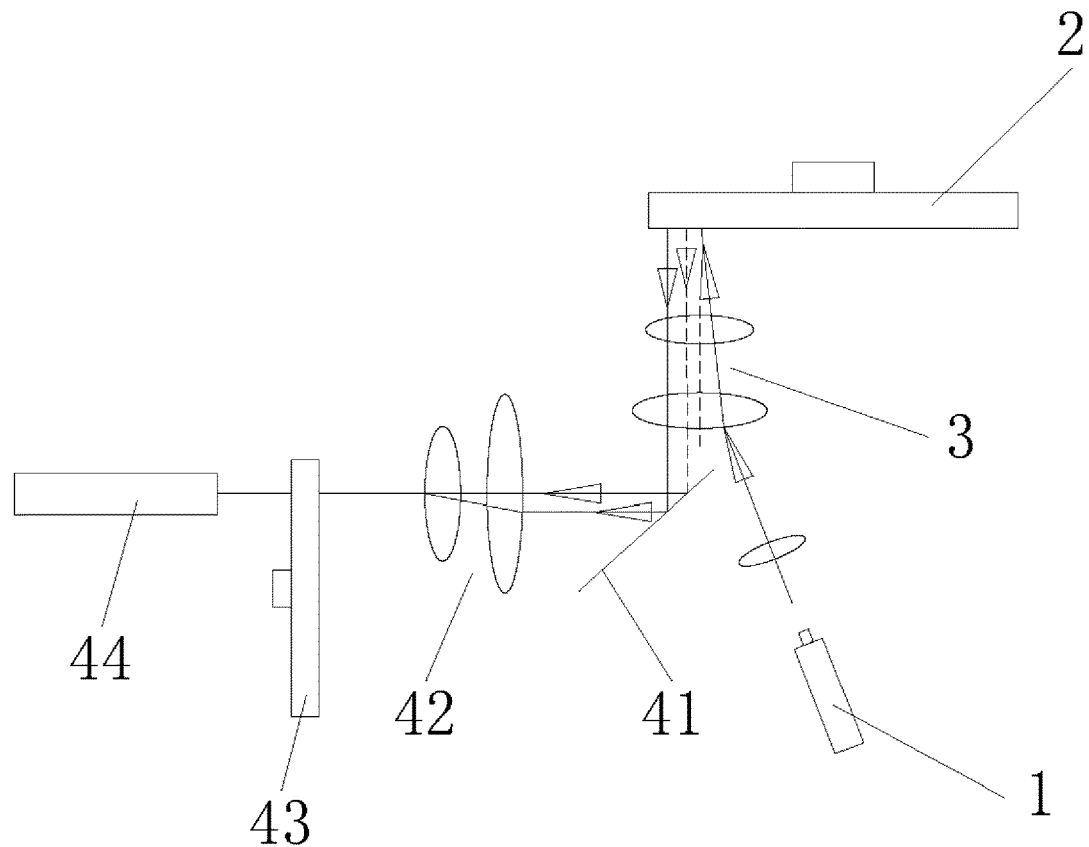
FIG. 3 is a schematic structure diagram of a non-coaxial projection light source system according to Embodiment 2.
Figure 4:
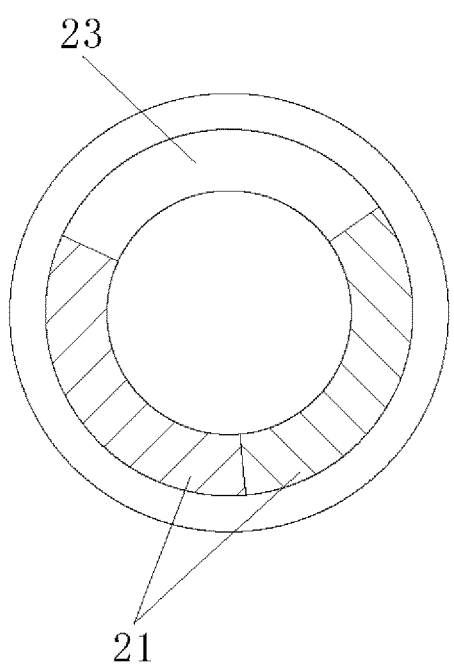
FIG. 4 is a schematic structure diagram of a fluorescent wheel of a non-coaxial projection light source system according to Embodiment 2.
Figure 5:
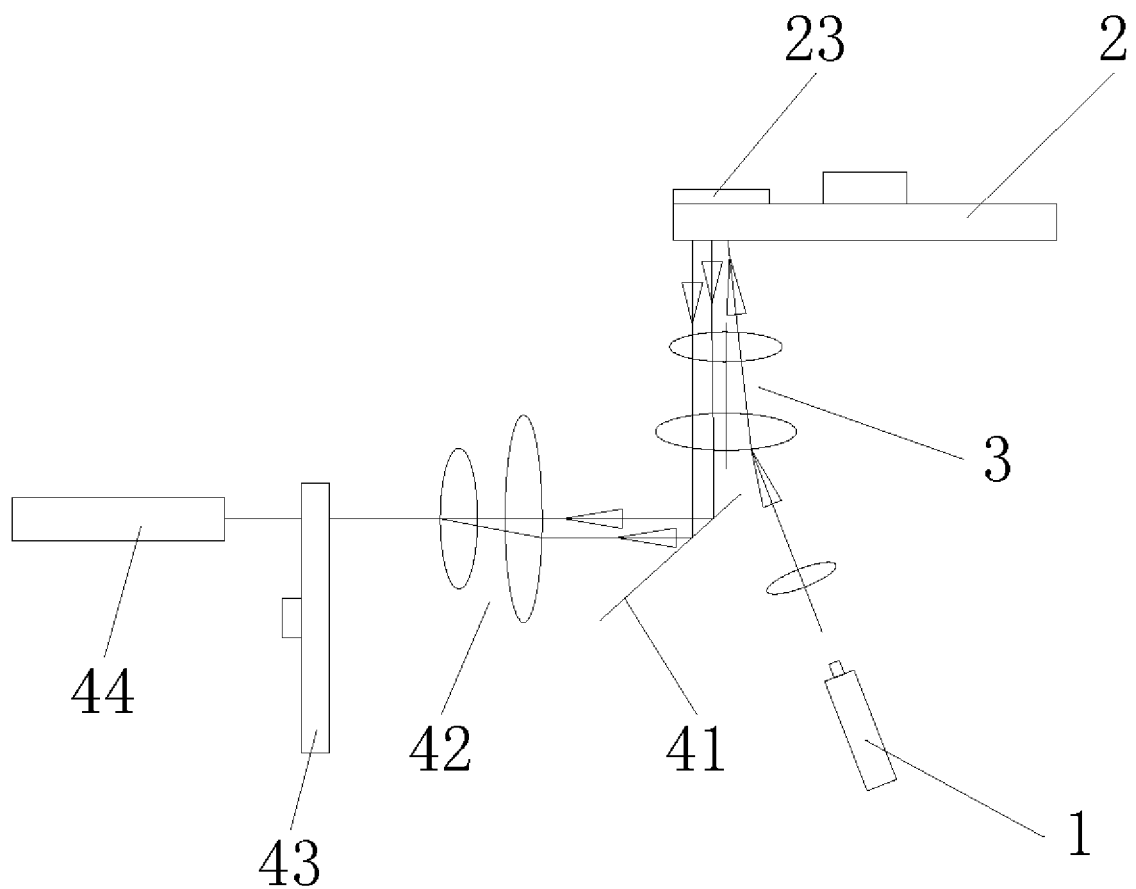
FIG. 5 is a second schematic structure diagram of a non-coaxial projection light source system according to Embodiment 2.

As shown in FIGS. 3 and 4, different from Embodiment 1, the fluorescent wheel 2 is provided with an excitation light reflection region 23 which is distributed in the same circumference as the phosphor region 21. The excitation light reflection region 23 replaces the excitation light transmission region 22, and the excitation light reflection region 23 diffusely reflects the excitation light. As shown in FIG. 4, the excitation light reflection region 23 may be located on the same side of a phosphor wheel body as the phosphor region 21, and the excitation light reflection region 23 may be formed by coating or the like. As shown in FIG. 5, the excitation light reflection region 23 may also be a reflector disposed on the back side of the phosphor wheel parallel to the phosphor wheel. The back side of the fluorescent wheel is a side of the fluorescent wheel without the phosphor region. The excitation light is also a Lambert reflector light source after being reflected, and the reflected excitation light is emitted to the converging shaping lens group 3 for converging shaping and output. Since the excitation light emitted from the light source is emitted to the converging shaping lens group 3 in the direction inclined to the optical axis of the converging shaping lens group 3, the reflected excitation light passes through the converging shaping lens group 3 and then is converged in the other direction, which is the same as the converged emergent direction of the radiating fluorescent light, the converged emergent light path direction of the reflected excitation light and the light path direction of the incident excitation light are not in the same direction, a dichroic mirror is omitted, and the light paths can be separated. The reflected excitation light and the radiating fluorescent light are emitted to the light combining reflector 41 of the light combining assembly after passing through the converging shaping lens group 3, and then sequentially pass through the beam shaping module 42, the color-filter color wheel 43, and the light rod 44 for light combining output.

Embodiment 3

Figure 6:
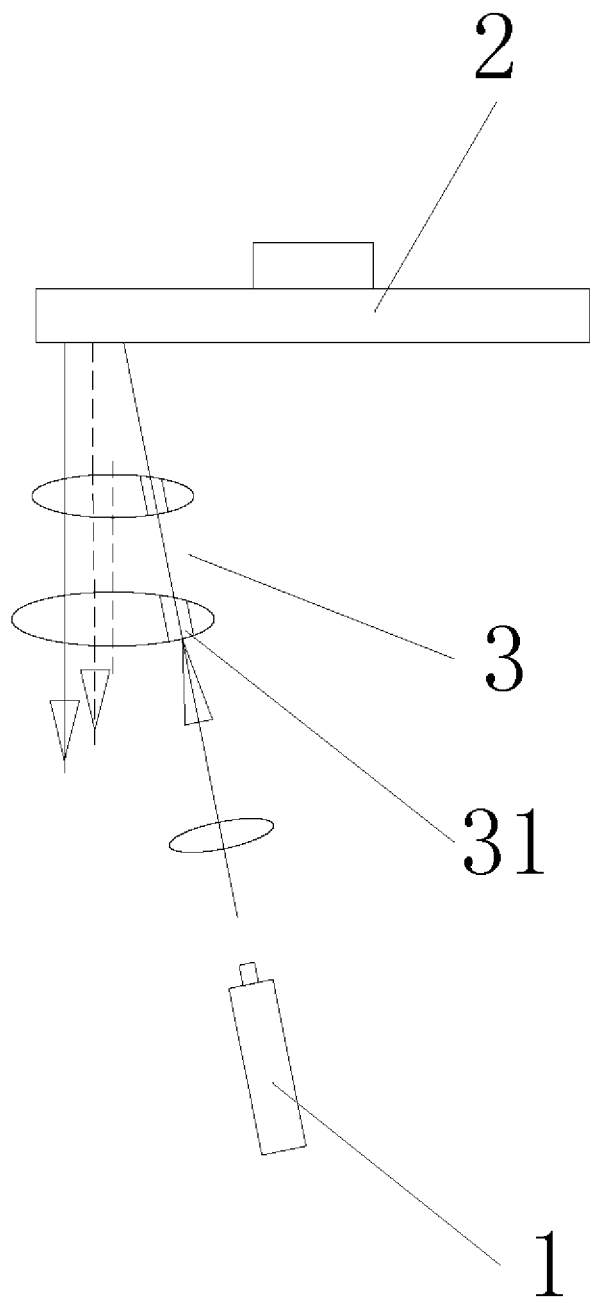
FIG. 6 is a schematic structure diagram of a converging shaping lens group of a non-coaxial projection light source system according to Embodiment 3.

As shown in FIG. 6, on the basis of Embodiment 1 and Embodiment 2, the converging shaping lens group 3 may be provided with a through hole 31 through which excitation light emitted to the fluorescent wheel directly passes. That is, the excitation light incident to the fluorescent wheel 2 directly irradiates the fluorescent wheel 2 without the converging shaping effect of the converging shaping lens group 3. Since the blue laser source adopted by the light source 1 is collimated parallel light, the directivity is good, the excitation efficiency of the radiating fluorescent light generated when the phosphor region is irradiated can be ensured, and the light path of the excitation light incident to the fluorescent wheel 2 can be better separated from the light path of the radiating fluorescent light converged by the converging shaping lens group 3. In this solution, an aspheric lens or a spherical lens may be adopted as the lens of the converging shaping lens group 3.

Embodiment 4

On the basis of Embodiment 1 and Embodiment 2, the excitation light emitted by the light source 1 irradiates the fluorescent wheel 2 in a direction inclined to the rotation axis of the fluorescent wheel 2 after being transmitted through the converging shaping lens group 3, so that the emergent light path direction of the radiating fluorescent light converged by the converging shaping lens group 3 is better separated from the light path direction of the incident excitation light. The optical axis of the converging shaping lens group 3 can better separate the converged emergent light path direction of the radiating fluorescent light from the light path direction of the incident excitation light along the rotation axis of the fluorescent wheel 2 or the rotation axis of the fluorescent wheel 2 inclined to the optical axis of the converging shaping lens group 3.

The above is only a preferred implementation of the disclosure, and it should be noted that the above preferred implementation should not be construed as limiting the disclosure, but the scope of protection of the disclosure should be determined by the scope of the appended claims. A number of modifications and refinements may be made by those of ordinary skill in the art without departing from the spirit and scope of the disclosure, and such modifications and refinements are also considered to be within the scope of protection of the disclosure.

What is claimed is:

1. A non-coaxial projection light source system, comprising a light source, a fluorescent wheel, and a converging shaping lens group located between the light source and the fluorescent wheel, wherein excitation light emitted by the light source is emitted to the converging shaping lens group in an optical axis direction inclined to the converging shaping lens group and then is emitted to the fluorescent wheel, and radiating fluorescent light generated by excitation on the fluorescent wheel is emitted to the converging shaping lens group and then is converged to a light path direction different from the excitation light to be output.

2. The non-coaxial projection light source system as claimed in claim 1, wherein the converging shaping lens group is provided with a through hole through which excitation light directly passes.

3. The non-coaxial projection light source system as claimed in claim 1, wherein the radiating fluorescent light generated by excitation on the fluorescent wheel is converged by the converging shaping lens group to the optical axis direction of the converging shaping lens group.

4. The non-coaxial projection light source system as claimed in claim 1, wherein the excitation light emitted by the light source irradiates the fluorescent wheel in a direction inclined to a rotational axis of the fluorescent wheel after being transmitted through the converging shaping lens group.

5. The non-coaxial projection light source system as claimed in claim 1, wherein the Abbe number of at least one lens in the converging shaping lens group is less than or equal to 30.

6. The non-coaxial projection light source system as claimed in claim 1, wherein the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions.

7. The non-coaxial projection light source system as claimed in claim 6, wherein the excitation light transmission region is a white glass or diffuser disposed on the phosphor wheel.

8. The non-coaxial projection light source system as claimed in claim 6, wherein the excitation light reflection region diffusely reflects the excitation light.

9. The non-coaxial projection light source system as claimed in claim 6, wherein the excitation light reflection region is a reflector disposed on the back side of the phosphor wheel parallel to the phosphor wheel.

10. The non-coaxial projection light source system as claimed in claim 1, further comprising: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output.

11. The non-coaxial projection light source system as claimed in claim 2, wherein the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions.

12. The non-coaxial projection light source system as claimed in claim 3, wherein the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions.

13. The non-coaxial projection light source system as claimed in claim 4, wherein the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions.

14. The non-coaxial projection light source system as claimed in claim 5, wherein the fluorescent wheel is provided with a plurality of phosphor regions along a circumferential direction for exciting to generate radiating fluorescent light of different colors, and the fluorescent wheel is further provided with an excitation light transmission region or an excitation light reflection region distributed in the same circumference as the phosphor regions.

15. The non-coaxial projection light source system as claimed in claim 2, further comprising: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output.

16. The non-coaxial projection light source system as claimed in claim 3, further comprising: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output.

17. The non-coaxial projection light source system as claimed in claim 4, further comprising: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output.

18. The non-coaxial projection light source system as claimed in claim 5, further comprising: a light combining assembly, wherein the light combining assembly comprises a light combining reflector, a beam shaping module, and a color-filter color wheel and a light rod which rotate synchronously with the fluorescent wheel, and the radiating fluorescent light converged from the converging shaping lens group is emitted to the light combining reflector and then sequentially passes through the beam shaping module, the color-filter color wheel, and the light rod for light combining output.

* * * * *